June 9, 1953 T B. CHARLES ET AL 2,641,352
AUTOMATIC EGG COLLECTING SYSTEM
Filed July 8, 1949 3 Sheets-Sheet 1
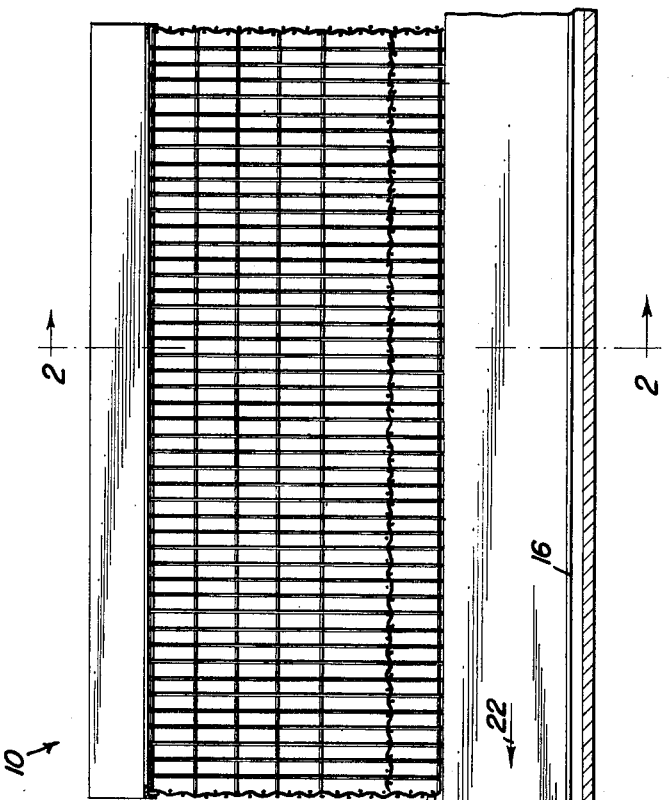
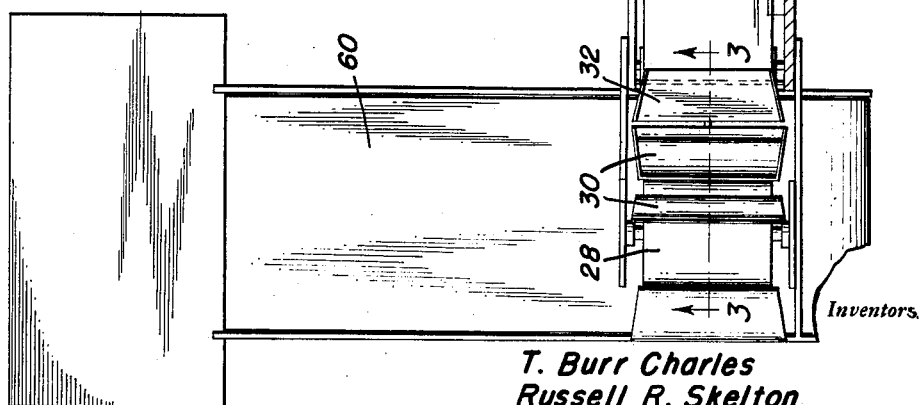
Inventors.
T. Burr Charles
Russell R. Skelton
By *Clarence A. O'Brien and Harvey B. Jacobson*
Attorneys June 9, 1953 T B. CHARLES ET AL 2,641,352
AUTOMATIC EGG COLLECTING SYSTEM
Filed July 8, 1949 3 Sheets-Sheet 2
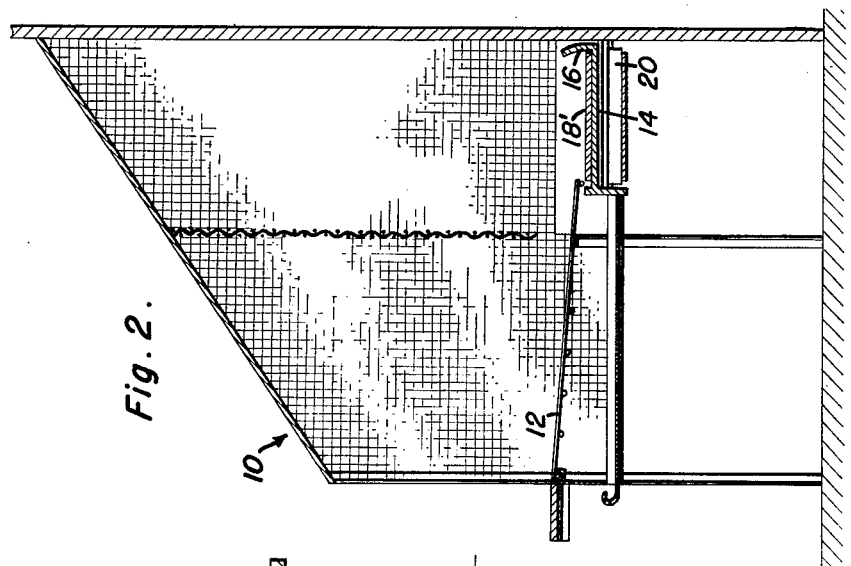
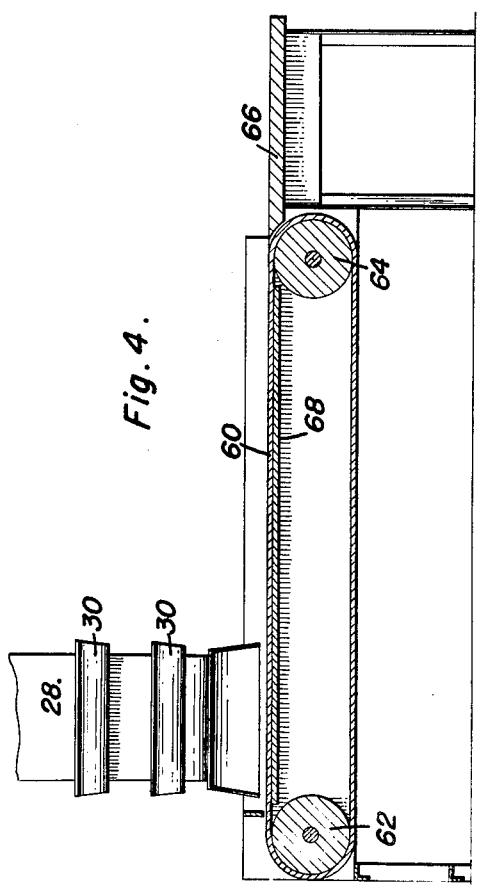
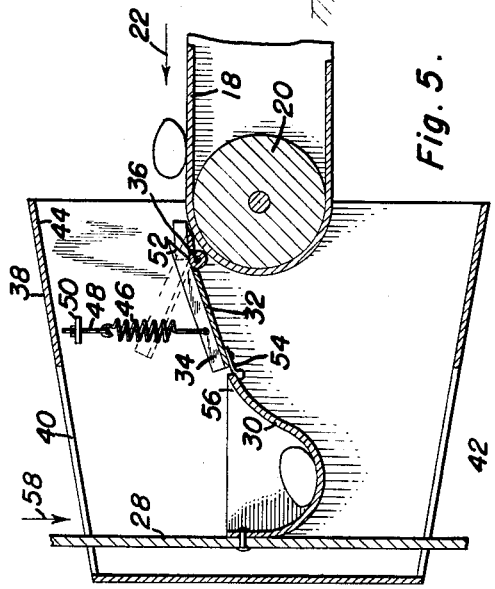
Inventors.
T. Burr Charles
Russell R. Skelton
By *Clarence A. O'Brien
and Harvey B. Jacobson*
Attorneys

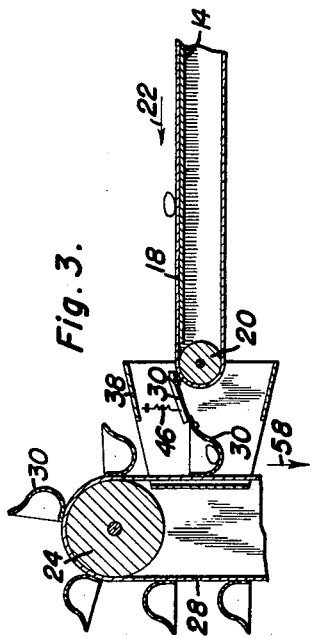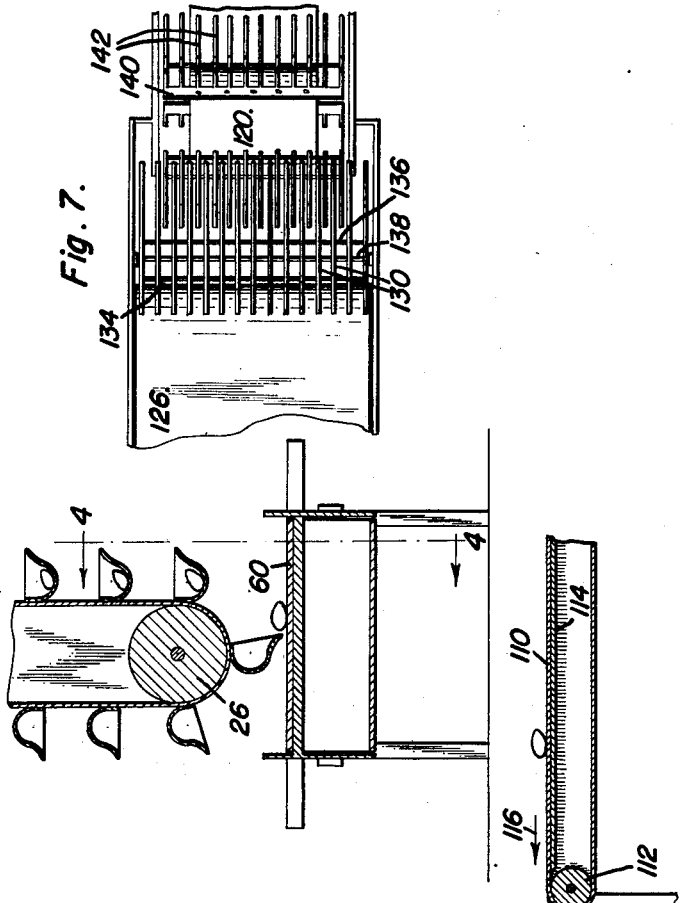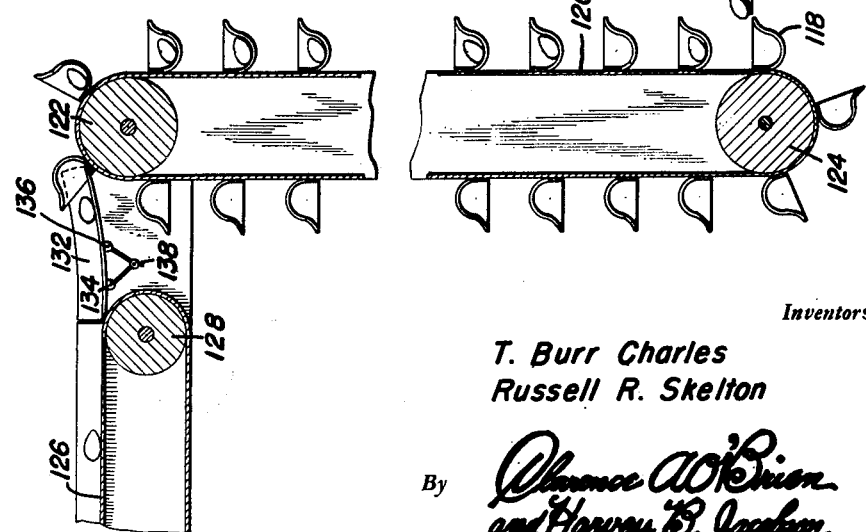

Patented June 9, 1953

2,641,352

UNITED STATES PATENT OFFICE 2,641,352

AUTOMATIC EGG COLLECTING SYSTEM

T. Burr Charles and Russell R. Skelton, Durham, N. H.

Application July 8, 1949, Serial No. 103,694

3 Claims. (Cl. 198—27)

This invention comprises novel and useful improvements in an automatic egg collecting system and more specifically pertains to a system of conveyors specifically adapted for use with batteries and laying houses for poultry for automatically and continuously collecting and removing the eggs from the nests and delivering the same to a sorting and grading table or conveyor.

The principal object of this invention is to provide an apparatus for automatically collecting eggs from poultry houses in an improved, safe and dependable and entirely automatic manner.

A further object of the invention is to provide an apparatus as set forth in the preceding paragraph, wherein a plurality of horizontal conveyors, each collecting the eggs from a horizontal row of nests of a battery, are automatically and safely discharged to an elevating conveyor for delivery of the collected eggs to a sorting and grading conveyor vertically spaced from the collecting conveyors.

A still further important object of the invention is to provide automatic means for preventing discharge of eggs from the collecting conveyors except when a receptacle of a vertical elevating conveyor is in registry therewith.

Yet another object of the invention is to provide an apparatus as set forth in the preceding objects wherein improved means are provided for discharging the eggs from the elevating conveyor to the grading or sorting conveyor by an improved and compact assembly.

These, together with various ancillary features and objects of the invention which will later become apparent as the following description proceeds, are attained by this device, preferred embodiments of which have been illustrated by way of example only in the accompanying drawings, wherein:

Figure 1 is a fragmentary top plan view of one embodiment of apparatus for carrying out the principles of the invention, this view illustrating one of the horizontal collecting conveyors with which the invention is provided;

Figure 2 is a vertical transverse sectional view taken substantially upon the plane of the section line 2—2 of Figure 1 and showing the relative location of one of the horizontal collecting conveyors with reference to one of the nests of the poultry battery with which the invention is associated;

Figure 3 is a vertical longitudinal sectional view taken substantially upon the plane of section line 3—3 of Figure 1 and illustrating the relative arrangement of one of the horizontal collecting conveyors, the vertical elevating conveyor and a grading and sorting conveyor associated therewith;

Figure 4 is a vertical sectional view taken substantially upon the plane of the section line 4—4 of Figure 3 and illustrating the construction and arrangement of the grading and sorting conveyor;

Figure 5 is a fragmentary vertical sectional view upon an enlarged scale of a part of Figure 3, illustrating the automatic delivery chute and its coaction with the elevating and the horizontal collecting conveyors;

Figure 6 is a view similar to Fig. 3 of a modified form of apparatus in which the eggs delivered by the horizontal collecting conveyors are elevated to a grading and sorting table instead of being lowered to the same as in the preceding embodiment; and Figure 7 is a top plan view of a portion of the construction of Figure 6 showing the coaction of the novel receptacle means and the delivery chute means of this embodiment.

Referring now more specifically to the accompanying drawings, wherein like numerals designate similar parts throughout the various views, attention is directed first to the embodiment of Figures 1–5, wherein the numeral 10 designates generally a portion of the horizontal row of poultry nests with which this invention is to be associated, it being understood that the battery may consist of one or more vertically spaced horizontal rows of wire or other cages for receiving poultry.

As shown more clearly in Figure 2, the individual nests of the laying houses or cages of the battery 10 are provided with inclined bottom surfaces 12 upon which the eggs are laid by the fowl and which are downwardly inclined so that the newly laid eggs will descend by gravity and be discharged upon the surface of a horizontal collecting conveyor 14 which thus runs beneath the horizontal row of nests or cages with which it is associated.

This conveyor may be of any suitable construction, and preferably consists of a flexible belt type conveyor having a raised side wall 16 on that side which is opposite from the end of the inclined bottom wall 12 of the nest, and if desired may be lined upon its upper surface with a cushioning layer 18' of any suitable construction. The conveyor 14 consists of a horizontally disposed guide surface having at its edge opposite the lower end of the inclined bottom wall 12 a vertical side wall 16 which constitutes a guide, a conveyor in the form of a flexible belt or the like 18 being slidably received upon the guide 14. This conveyor 18 is preferably in the form of an endless belt which is entrained at its ends over supporting rollers 20, one of which may be connected with any suitable source of power, which in itself forms no part of this invention, and hence has not been illustrated.

The conveyor belt 18 preferably is moved in one direction, as indicated by the arrows 22 in Figures 1, 2 and 5. At its discharge end, each of the horizontal collecting conveyors 18 delivers the eggs collected thereon and transported thereby to a vertical elevating conveyor for delivery thereby to a grading and sorting conveyor. This elevating conveyor consists of upper and lower supporting rolls 24 and 26, mounted in any desired manner upon any conventional and suitable supporting framework and over these rolls is entrained an endless belt or similar type of conveyor 28 having a plurality of longitudinally spaced receptacles 30 thereon. These receptacles, as shown clearly in Figures 3 and 5, are preferably cup or dish-shaped, and upon rotation of the rolls 24 and 26 by any desired mechanism, not shown, the receptacles are in turn brought into spaced but substantially registering position with the discharge end of the collecting conveyor or conveyors 18. Interposed between the vertical elevator and the horizontal collecting conveyors are delivery chutes, one being provided for each of the horizontal collecting conveyors, as will be readily understood.

These delivery chutes, as shown best in Figure 5, consist of a bottom wall 32, having parallel side walls 34 constituting egg retaining and guiding means thereon, this chute being open at its two ends and being hinged or pivoted upon a transverse pivot or hinge 36, so that the delivery chute is pivotally or tiltably mounted between the vertical elevating conveyor and the horizontal collecting conveyor. Preferably, the supporting framework of this device includes a suitable casing 38 having upper and lower vertically aligned openings 40 and 42 for receiving the endless vertical elevating conveyor 28 and the receptacles 30 for passage therethrough, together with an open end 44 for receiving the end of the horizontal collecting conveyor 18, and for mounting the hinge or pivot pin 36 of the delivery chute. This delivery chute further includes a tension spring 46 which is terminally connected to the delivery chute as by one side wall 34 thereof, and to an adjusting bolt 48 mounted upon a suitable lug 50 carried by the housing 38.

This arrangement is such that by properly adjusting the bolt 48, the spring 46 may be given any desired tension, and thereby the force which yieldingly urges the delivery chute into its dotted line raised position shown in Figure 5, can be accurately regulated. At its inlet end, the delivery chute has its bottom wall curved or turned upwardly as at 52, so that when the chute is in its lowered or discharging position, this end wall will be raised as shown in Figure 5, and thereby block discharge of an egg from the conveyor 18 into the delivery chute, while an egg previously received upon the chute will be discharged from the outlet end thereof into the registering receptacle.

For this purpose, means is provided for causing the pivotal movement of the delivery chute into its lowered or discharging position when the receptacle is in registry with the corresponding horizontal collecting conveyor. This means includes a finger or lug 54 secured to the outlet end of the delivery chute and extending therebeyond into the path of travel of the lip 56 of a receptacle 30, so that when the receptacle is moved downwardly in the direction indicated by the arrow 58 in Figures 3 and 5, the lip 56 will engage the finger 54 and tilt the chute against the opposition of its spring from the dotted line position to the full line position shown in Figure 5. The egg resting upon the chute will then be discharged into the receptacle 30, and as the receptacle moves downwardly and the lip disengages the lug 54, the spring 46 will return the chute to its upper position. In this upper position, the raised end wall 52 will be lowered so that the next egg carried by the horizontal conveyor 18 may be shoved or pushed into the end of the chute in readiness for the next actuation of the same.

As the elevating conveyor moves in the direction indicated by the arrow 58, the eggs received in the receptacles will be successively lowered and discharged when the receptacles reach their lowermost position, as indicated clearly in Figure 3, these discharged eggs being then received upon a sorting or grading conveyor 60, of any desired construction, which preferably consists of an endless belt entrained over a pair of supporting rollers 62 and 64 mounted upon any suitable support such as a table or the like 66, the upper flight of this belt being received upon a supporting or guiding surface 68 underlying the same. Preferably, the grading and sorting conveyor 60 is of a greater width than the horizontal collecting conveyors 18 so that the eggs discharged thereon from the plurality of horizontal conveyors may be sufficiently spread apart for convenient inspection for grading and sorting.

From the foregoing, the construction, operation and advantages of this embodiment of the invention will be readily understood and further explanation is believed to be unnecessary.

Reference is now made to Figures 6 and 7 for a second form of apparatus which operates upon similar principles to that just described.

In this form of the invention, eggs are delivered as in the preceding arrangement to the upper flight of one or more horizontally disposed collecting conveyors 110, which are entrained over horizontal supporting rollers 112, one of which is shown in Figure 6, the upper flight of this belt being supported by a horizontal guide surface 114. The horizontal collecting conveyors, only one of which is shown in Figure 6, delivers eggs from the discharge end thereof, the belt moving in the direction indicated by the arrow 116, to a plurality of receptacles 118, each of which is preferably of the shape of cup or dish, these receptacles being attached to a vertically disposed elevating conveyor 120 in the form of an endless belt entrained over upper and lower supporting rollers 122 and 124. The eggs are thus elevated by the receptacles from each of the horizontal collecting conveyors, lifted to the top of the elevating conveyor, and from the top thereof are discharged upon the upper surface of a horizontally disposed sorting and grading conveyor 126 spaced vertically above the one or more horizontal collecting conveyors, and upon the opposite side of the vertical elevating conveyor therefrom.

The grading and sorting conveyor may be of the same identical construction as that set forth in the preceding embodiment, it being entrained over end rollers 128, and also being of greater width than the horizontal collecting conveyors so that the eggs received thereon may be separated and conveniently inspected, graded and sorted.

As in the preceding embodiment, a delivery chute is interposed between the elevating conveyor and the grading and sorting conveyor. This chute is, however, of a different construction and differently operated from the chute of the preceding embodiment. As shown in Figure 7, the chute includes a bottom wall consisting of a plurality of spaced fingers or strips 130, together with side walls 132, and are held in properly assembled relation by means of three, parallel, triangularly disposed cross-bars 134, 136, and 138, which are suitably carried by the framework of the grading and sorting conveyor. Cooperating with this grill-like construction of the delivery chute is a somewhat similar construction of each of the receptacles 118, which receptacles include a cross-bar 140 rigidly secured to the conveyor belt 120, which cross-bar has integrally or rigidly attached thereto a plurality of parallel, laterally spaced fingers or strips 142 having the proper shape to produce in their entirety a grill-like receptacle. The spaced fingers of the receptacles are adapted to be interdigitated with and passed between the corresponding spaced fingers 130 of the delivery chute, as will be clearly seen by reference to Figure 7, whereby the eggs lifted by the receptacles will be discharged upon the delivery chute, and will descend by gravity to the grading and sorting conveyor 126, it being contemplated that the eggs so delivered will move out of the path of travel of the receptacles before the latter pass between the fingers of the delivery chute and start their downward travel.

From the foregoing, the construction and operation of both embodiments of the apparatus will now be readily understood, and further explanation is believed to be unnecessary.

However, since numerous modifications and changes will readily occur to those skilled in the art, it is not desired to limit the invention to the exact construction shown and described in the foregoing description and attached drawings, and accordingly, it is to be understood that all suitable embodiments and modifications may be employed which fall within the scope of the appended claims.

Having described the invention, what is claimed as new is:

1. An egg collector comprising horizontal collecting conveyor means for collecting eggs from a row of nests, a horizontal delivery conveyor means vertically spaced from said collecting conveyor means, a vertical conveyor for transporting eggs from said collecting conveyor means to said delivery conveyor means, receptacles on said vertical conveyor means, a delivery chute mounted for pivotal movement, means operated by a receptacle for pivoting said chute to a lowered position connecting the collecting conveyor means and a receptacle, a housing through which said vertical conveyor moves and into which one end of said horizontal collecting conveyor extends, said chute being pivotally supported by said housing.

2. An egg collector comprising horizontal collecting conveyor means for collecting eggs from a row of nests, a horizontal delivery conveyor means vertically spaced from said collecting conveyor means, a vertical conveyor for transporting eggs from said collecting conveyor means to said delivery conveyor means, receptacles on said vertical conveyor means, a delivery chute mounted for pivotal movement, means operated by a receptacle for pivoting said chute to a lowered position connecting the collecting conveyor means and a receptacle, spring means urging said chute into a raised position in operative connection with a receptacle.

3. An egg collector comprising horizontal collecting conveyor means for collecting eggs from a row of nests, a horizontal delivery conveyor means vertically spaced from said collecting conveyor means, a vertical conveyor for transporting eggs from said collecting conveyor means to said delivery conveyor means, receptacles on said vertical conveyor means, a delivery chute mounted for pivotal movement between the collecting conveyor and the vertical conveyor, spring means urging said chute into a raised position with its inlet end in operative registry with the collecting conveyor and its outlet end above the latter, and actuating means operable by a receptacle for tilting the chute with its outlet end below said collecting conveyor and its inlet end elevated to block delivery of the collecting conveyor.

T. BURR CHARLES.
RUSSELL R. SKELTON.

References Cited in the file of this patent

UNITED STATES PATENTS

| Number | Name | Date |
|---|---|---|
| 663,142 | Warning | Dec. 4, 1900 |
| 761,320 | Porter | May 31, 1904 |
| 874,037 | Schreiber | Dec. 17, 1907 |
| 1,352,262 | Harding | Sept. 7, 1920 |
| 1,516,170 | Young | Nov. 18, 1924 |